(12) United States Patent
Pottier et al.

(10) Patent No.: US 8,297,664 B2
(45) Date of Patent: Oct. 30, 2012

(54) FASTENING FLANGE

(76) Inventors: Xavier Pottier, Montigne le Brillant (FR); Hervé Bouilly, Le Genest St. Isle (FR)

( * ) Notice: Subject to any disclaimer, the term of this patent is extended or adjusted under 35 U.S.C. 154(b) by 666 days.

(21) Appl. No.: 12/401,155

(22) Filed: Mar. 10, 2009

(65) Prior Publication Data

US 2010/0230955 A1    Sep. 16, 2010

(51) Int. Cl.
*F16L 23/00* (2006.01)
(52) U.S. Cl. .................................... 285/414; 285/415
(58) Field of Classification Search ............... 285/135.1, 285/400, 414, 415, 387, 388
See application file for complete search history.

(56) References Cited

U.S. PATENT DOCUMENTS

| | | | | |
|---|---|---|---|---|
| 112,958 A * | 3/1871 | Ramp | | 285/391 |
| 1,898,617 A * | 2/1933 | Church | | 285/39 |
| 2,192,962 A * | 3/1940 | Dalzell | | 285/387 |
| 2,353,012 A * | 7/1944 | Cheney | | 285/387 |
| 2,774,616 A * | 12/1956 | Dodd et al. | | 285/33 |
| 3,575,675 A * | 4/1971 | Hirsch et al. | | 333/254 |
| 3,821,670 A * | 6/1974 | Thompson | | 333/255 |
| 3,942,141 A * | 3/1976 | Kaffenberger | | 333/254 |
| 4,516,278 A * | 5/1985 | Lamond | | 4/679 |
| 4,991,881 A * | 2/1991 | Davis et al. | | 285/330 |
| 2006/0175835 A1* | 8/2006 | Kronmeyer | | 285/387 |

* cited by examiner

*Primary Examiner* — Aaron Dunwoody
(74) *Attorney, Agent, or Firm* — Polsinelli Shughart PC

(57) ABSTRACT

A flange for fastening a line to a pump casing, includes: a pump casing passage; and a plurality of stop members protruding in the passage and angularly distributed around the passage, the position of the flange being angularly adjustable by the stop members. A pump may include the fastening flange. A method for adjusting the position of the flange in relation to the pump is also disclosed. This method makes it possible to avoid the position of the pump casing being imposed by the orientation of the fastening flange of the pump casing.

14 Claims, 6 Drawing Sheets

FASTENING FLANGE

FIELD OF THE INVENTION

The present invention concerns a fastening flange and a pump casing.

BACKGROUND

Single-piece fastening flanges can be molded to the ends of pump casings and lines to be connected. The single-piece flange molded on the pump casing is oriented along the axis of the pump motor or oriented perpendicular to the axis of the motor. The line and the pump casing are generally connected by two bolts with nuts which tighten the flange of the pump casing against the flange of the line.

One assembly problem of a pump casing including a flange of this type is that the pump casing connected to the line is positioned according to a single position. In other words, the position of the pump casing is imposed by the orientation of the single-piece fastening flange molded to the end of the pump casing.

There is therefore a need for a simpler method of fastening a pump casing to a line.

SUMMARY

To this aim, it is proposed a flange for fastening a line to a pump casing, the flange comprising:
  a pump casing passage;
  a plurality of stop members protruding in the passage and angularly distributed around the passage, the position of the flange being angularly adjustable by the stop members.

In other embodiments, a flange may comprise one or more of the following features:
  the stop members comprise a positioning housing for positioning of the flange, the positioning housing being open according a direction in the lengthwise of the passage;
  the stop members comprise two positioning housings for positioning of the flange, each positioning housings for positioning is open according a direction opposite in the lengthwise of the passage;
  the stop members comprise a flat surface perpendicular to the passage;
  the flange has a shape which has three axes of symmetry;
  the stop members comprise protuberances protruding parallel to the axis of the passage.

Another pump is also proposed, including:
a fastening flange including:
  a pump casing passage;
  a plurality of stop members protruding in the passage and angularly distributed around the passage,
  a pump casing extending in the passage of the flange, the pump casing including a stop surface,
  the position of the flange being angularly adjustable in relation to the pump casing by connecting the stop surface and the stop members.

In other embodiments, the pump may include one or more of the following features:
  the stop surface is a plurality of snug protruding from the pump casing, the position of the flange being angularly adjustable in relation to the pump casing by connecting the stop members and the snug;
  the pump casing comprises as many snug as there are stop members and the distribution around the pump casing of the snug corresponds to the distribution of the stop members;
  the stop members of the flange comprise a positioning housing for positioning of the flange, the positioning housing being open according a direction in the lengthwise of the passage and wherein each snug is received in a positioning housing of the flange;
  the stop members comprise two positioning housings for positioning of the flange, each positioning housing is open according a direction opposite in the lengthwise of the passage;
  the pump casing also comprises a support surface of the flange, the position of the flange being angularly adjusted in relation to the pump casing by rotation of the flange around the pump casing on the support surface;
  the pump casing comprises a single stop surface which is continuous over the perimeter of the pump casing;
  the stop members of the flange comprise a flat surface perpendicular to the passage;
  the flange is removable in relation to the pump casing.

A method is also proposed for adjusting the position of a flange in relation to a pump, wherein the pump comprises:
  a fastening flange including:
  a pump casing passage;
  a plurality of stop members protruding in the passage and angularly distributed around the passage,
  a pump casing extending in the passage of the flange, the pump casing including a stop surface,
  and the method comprises:
  the rotation of the flange around the pump casing up to a desired angular position of the flange in relation to the pump casing, and
  the connection of the stop members with the stop surface.

In other embodiments, the pump also includes a support surface for the flange, and the stop surface being a plurality of snug, and a method includes,
  prior to rotation of the flange, the engagement of the flange on the pump casing up to the support surface, the stop members of the flange being angularly shift in relation to the snug, and
  during the rotation of the flange, the guiding of the flange in rotation by the support surface.

In others embodiments, the flange comprises two diametrically opposite stop members in the passage, wherein a method comprises,
  prior to rotation of the flange, the engagement of the flange on the pump casing by inclining the flange in relation to the pump casing until the stop surface is introduced through the passage and the placing into contact of the stop members under the stop surface.

In other embodiments, the stop members of the flange include a positioning housing for positioning of the flange, each positioning housing is open according a direction in the lengthwise of the passage and in which the connection of the stop members with the stop surface is done by introducing each snug into a positioning housing of the flange.

In other embodiments, the stop members comprise protuberances protruding parallel to the axis of the passage and in which the connection of the stop members with the stop surface is done by placing the protuberances of the stop members in contact with the stop surface.

BRIEF DESCRIPTION OF THE DRAWINGS

Other features and advantages of the invention will appear upon reading the following detailed description of embodiments of the invention, given as example only and in reference to the drawings which show.

DETAILED DESCRIPTION OF THE DRAWINGS

It is proposed a fastening flange for fastening a line to a pump casing. The flange includes a pump casing passage. The flange also includes a plurality of stop members protruding in the passage. The stop members are angularly distributed around the passage. The position of the flange is angularly adjustable by the stop members in relation to the pump casing. This makes it possible to avoid that the position of the pump casing is imposed by the orientation of the fastening flange of the pump casing. The position of the flange can be oriented independently of the position of the pump casing in relation to the line. It is only enough to orient the flange appropriately in relation to the pump casing. This simplifies the method of fastening the pump casing to the line.

Figure 1:
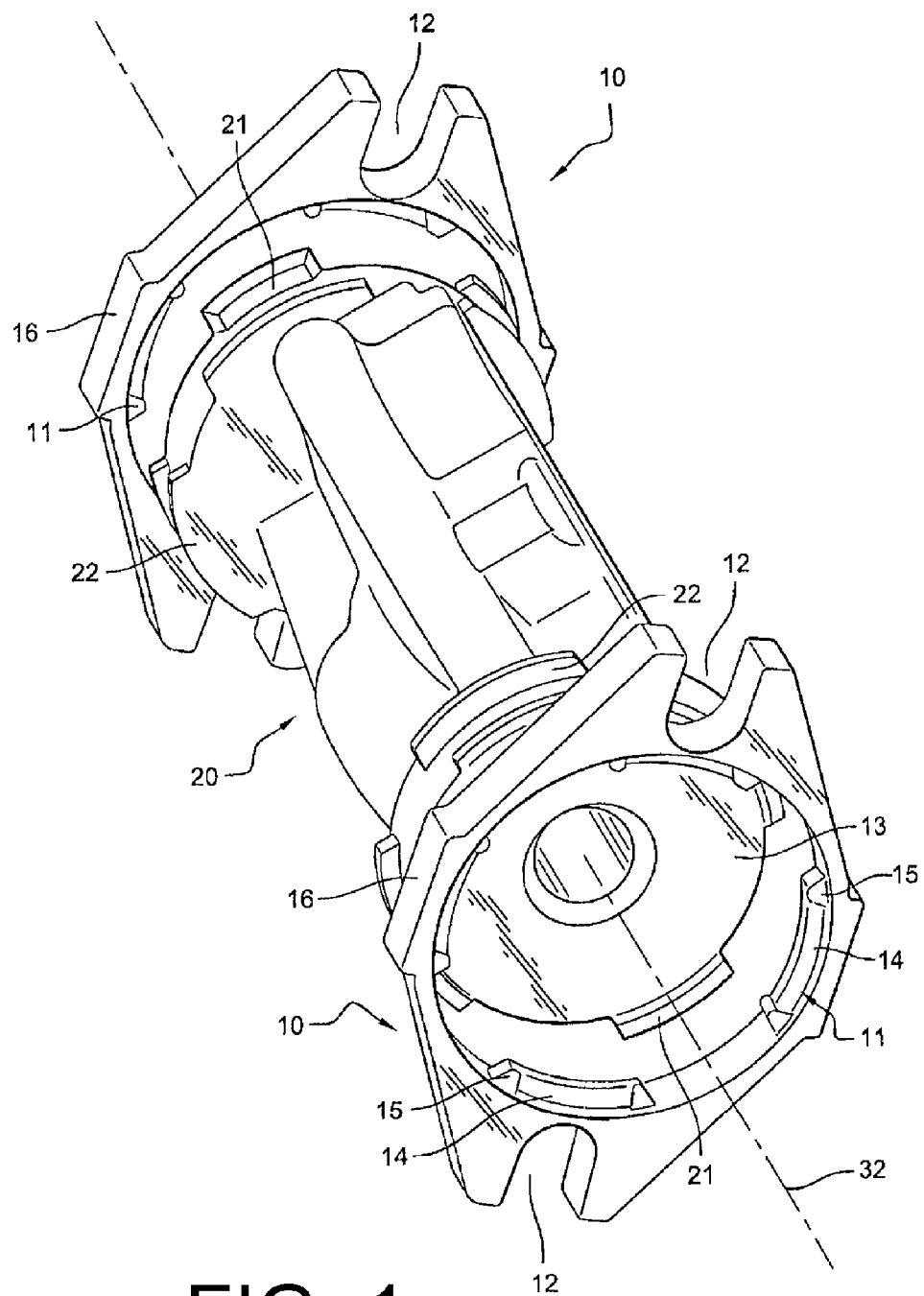
FIG. 1, a perspective view of two flanges and a pump casing according to a first embodiment.
Figure 9:
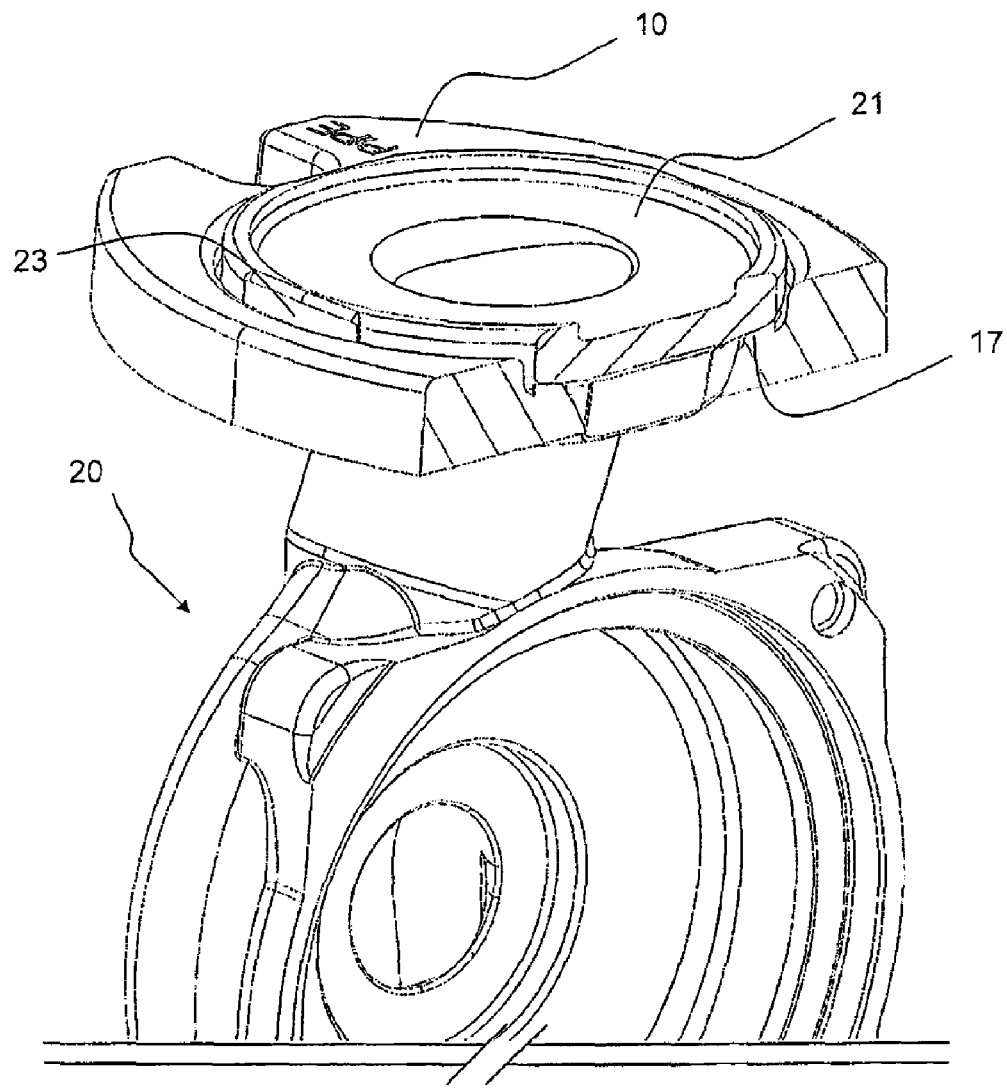
FIG. 9, a perspective and cross-sectional view of a pump casing provided with a flange of FIG. 6.

FIG. 1 shows a perspective view of two fastening flanges 10 and a pump casing 20 and FIG. 9 shows a perspective and cross-sectional view of a pump casing 20 provided with a flange 10. Pump casing 20 is intended to receive a motor 34 to form a pump. Pump casing 20 includes an outlet orifice at one end and an inlet orifice at the other end allowing the entry and exit of fluid in pump casing 20. Each orifice is intended to be connected to a line. The flanges 10 allow to connect each of the orifices to a line. For example, the flanges 10 are each fastened to a flange of the line to be connected. Pump casing 20 includes heads through which the orifices open. The heads of the pump casing are intended to receive the fastening flanges 10.

Figure 6:
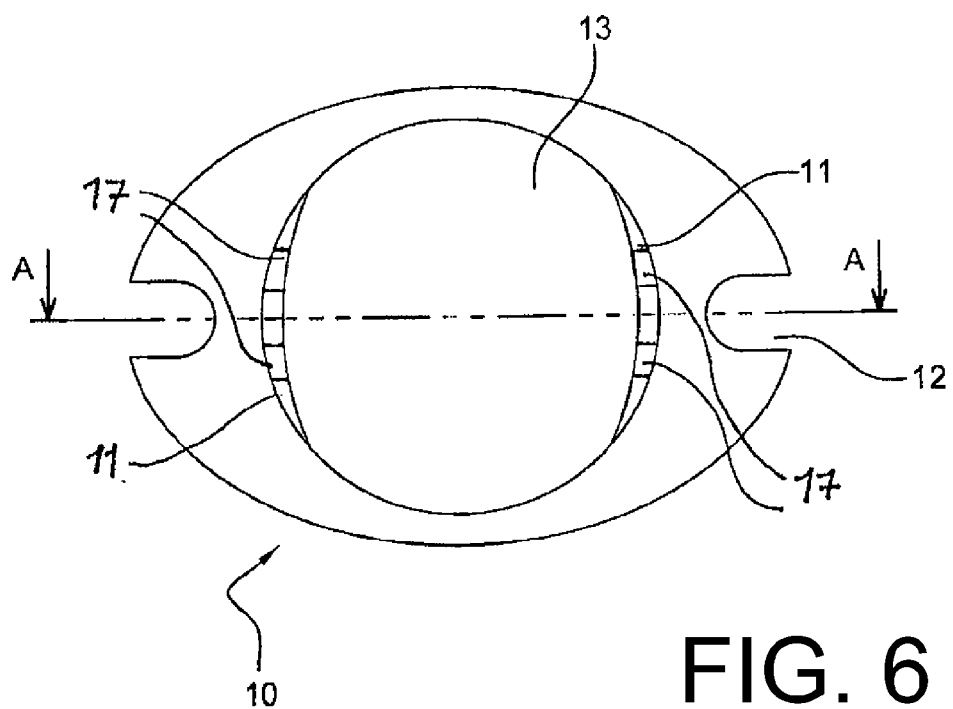
FIG. 6, a top view of a flange according to a second embodiment adapted to be installed on a pump casing of FIG. 8.

FIGS. 1 and 6 illustrate various embodiments of flanges 10 intended to be positioned with regard to an orifice of a pump casing 20. Flanges 10 mounted on a same pump casing are identical, but it is possible to install two different flanges 10 on a same pump casing 20. In the continuation of the description, a single flange 10 per pump is described. Pump casing 20 can be fastened to a line by tightening flange 10 against the flange of the respective line. The tightening thus enables to flange to grip and fasten pump casing 20 against the line.

Flange 10 can be removable relative to pump casing 20. This makes it possible to provide flange 10 independently of pump casing 20. This also makes it possible to replace flange 10 if necessary.

In order to insert flange 10 around pump casing 20, flange 10 includes a passage 13. Passage 13 allows the rotation of flange 10 around pump casing 20. The flange has a shape in one plane. Passage 13 can have different shape e.g. polygonal-type shapes. Passage 13 preferably has a circular shape in order to facilitate the rotation of the flange around pump casing 20. Thus flange 10 is generally ring-shaped. In order to be able to insert the end of pump casing 20 into passage 13, the size of the section of passage 13 is larger than a section at least one of the ends of pump casing 20.

According to FIGS. 1 and 6, flange 10 includes a plurality of stop members 11. Stop members 11 are protruding in passage 13. Stop members 11 allow preventing the removal of the flange outside pump casing 20. Stop members 11 can be angularly distributed around passage 13. Thus stop members 11 allow to position flange 10 in relation to pump casing 20 according to different angular positions. This adjustment is done by connecting stop members 11 with a stop surface 21 protruding from pump casing 20.

According to FIG. 1, the flange can include four stop members 11. Stop members 11 can be diametrically opposite two by two. Stop members 11 can be arranged 90° from each other around passage 13. A distribution angle of 90° has the advantage of positioning the pump casing in the two most common positions in relation to the line, i.e. along axis 33 of the pump motor or perpendicular to axis 33 of the pump motor.

Figure 7:
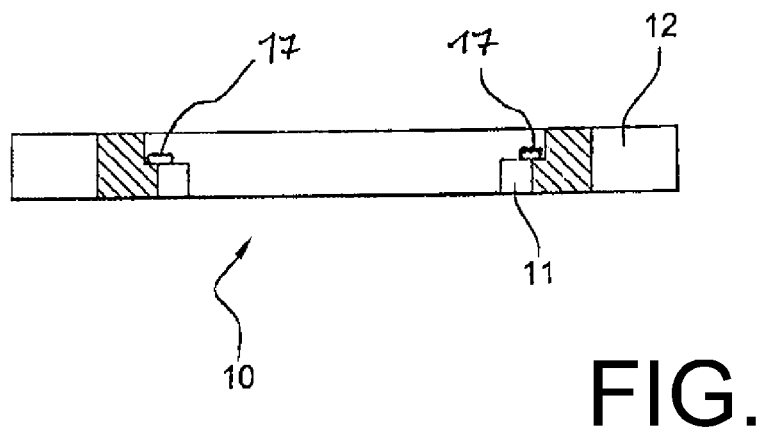
FIG. 7, a cross-sectional view of the flange of FIG. 6.

According to FIGS. 6 and 7, flange 10 can include two stop members 11. Stop members 11 can be diametrically opposite. Stop members 11 form a progressive narrowing of the diameter of passage 13. This makes it possible to facilitate the engagement of the flange on the pump casing while optimizing the contact between stop members 11 and the pump casing. The stop members form a flat, smooth surface, in a plane perpendicular to the axis 32.

Pump casing 20 includes a stop surface 21 of flange 10. In particular, stop members 11 of flange 10 engage with a stop surface 21. According to FIG. 1, stop surface 21 of pump casing 20 is in the form of snug. Pump casing 20 can comprise as many snug 21 as there are stop members 11. The distribution of the snug 21 can be identical to the distribution of stop members 11. This allows each stop member 11 to cooperate with a snug 21. According to FIG. 8, the stop surface of pump casing 20 is a continuous rim on the perimeter of the pump casing. This makes it possible for stop members 11 of the flange to cooperate with stop surface 21 regardless of the angular position of the flange in relation to the pump casing. According to FIG. 9 the pump casing can also include flat sections 23 on the perimeter of the pump casing thereby generating parts of stop surface 21. These flat sections 23 allow facilitating the introduction of flange 10 around pump casing 20. Furthermore, this may enable an increase of the size of stop members 11 toward the center of passage 13 of the flange 10, thereby improving the resistance of the flange.

According to FIG. 1, in order to position flange 10 on pump casing 20, stop members 11 of the flange of FIG. 1 can each comprise positioning housings 14. Positioning housings 14 allow wedging snug 21 in stop members 11. Thus, flange 10 has well-defined positions in relation to pump casing 20. This facilitates later fastening to the flange of the line. The positioning housings 14 are open according a direction in the lengthwise of passage 13 of pump casing 20 in flange 10. For example, the housings are open in the direction opposite to the direction of introduction 30 of pump casing 20 in the flange 10. This makes it possible to wedge snug 21 in the bottom of the positioning housings 11 when flange 10 is tightened against the corresponding flange of the line.

Positioning housings 14 can be defined by two protuberances 15 of the stop member 11. The two protuberances 15 make it possible to immobilize the snug 21 in the positioning housings 14 during mounting of flange 10 on pump casing 20.

Stop members 11 can also each have two positioning housings 14. The positioning housings 14 are identical but are each open according a direction opposite in the lengthwise of passage 13. Thus, the surface in front of pump casing 20 before introduction of the pump into the flange can be one of the two surfaces of the flange 10. Assembly is therefore easier.

Flange 10 of FIGS. 1 and 6 includes at least one attachment zone. The attachment zone allows to position an attachment member in order to fasten flange 10 against a line flange. Flange 10 can include several attachment zones in order to distribute the locking pressures on the flange 10. The attachment zones can be distributed angularly around flange 10 in order to distribute the locking pressure. Each attachment zone increases the bulk of the flange 10. In order to decrease the bulk of the flange 10, it is preferable for flange 10 to include only two diametrically opposite attachment zones.

Each attachment zone can be a recess 12 which goes through flange 10 parallel to the axis 32 of passage 13. Thus an attachment member such as a bolt can be inserted therein. Recesses 12 can be U-shaped. The U shape makes it possible to easily insert a screw of the bolt into recesses 12. In case the flange comprises two diametrically opposite U-shaped recesses, flange 10 is generally oval-shaped. A shape of this type is less bulky than a square-shaped dual-orientation flange.

Flange 10 comprises reinforcements 16 (visible in FIG. 1, for example) protruding from its external contour. Reinforcements 16 make it possible to increase the mechanical resistance of flange 10, in particular against the mechanical stresses exerted by the attachment systems on the flange.

Stop members 11 can also include protruding protuberances 17. Protuberances 17 make it possible, in the same way, to increase the mechanical resistance of flange 10 but also of stop members 11. According to FIGS. 6, 7, 9, a part of the protuberances can be located in front of recesses 12 and the protuberances can be protruding parallel to the axis of the passage. In this case, the protuberances of the stop members are adapted to be in contact with stop surface 21 of the pump casing. This arrangement allows that the support (the contact surface) between the flange and the pump casing is localized and is close to the attachment zones. Indeed, the stop members can include defects (which can result from a foundry operation) which can generate a random support. With these protuberances, the resting of the flange on the pump casing is more stable.

Flange 10 of FIGS. 1 and 6 can have several symmetries. Flange 10 can have a center of symmetry located at the center of passage 13 of the flange. Due to the symmetry of flange 10, flange 10 can pivot around axis 32 of passage 13 before introduction of pump casing 20 into flange 10. In particular, if flange 10 includes four stop members 11, flange 10 can be pivoted by 90° around axis 32 of passage 13 before being positioned on the pump casing. Before the introduction of pump casing 20 in flange 10, flange 10 can also be turned back by 180 degrees around an axis perpendicular to axis 32 of passage 13. Thus, the surface of flange 10 with regard to pump casing 20 can be one of the two surfaces of flange 10 perpendicular to the axis 32 of passage 13. According to FIGS. 1 and 6, each flange thus has a first axis of symmetry along the axis 32 of passage 13. The first axis of symmetry is perpendicular to the plane of the flange. Each flange also has a second axis of symmetry in the plane of the flange and going through the attachment zones. Still according to FIG. 1, each flange has a third axis of symmetry perpendicular to the second axis of symmetry, in the plane of the flange. These symmetries therefore make assembly easier.

Flange 10 and pump casing 20 can be obtained using a molding or smelting method, in particular without machining. This allows easy manufacturing of these elements. The shapes of these elements are such that they are obtained by natural stripping.

Snug 21 according to FIG. 1 can have a shape complementary to the shape of stop members 11. Such a complementary shape allows to appropriately position flange 10 in relation to pump casing 20. Such a complementary shape also allows to optimize the contact surface between stop members 11 and snug 21. Stop surface 21 according to FIG. 8 can have a smooth surface; this makes it possible to easily manufacture the stop surface and to position flange 10 according to an infinite number of positions in relation to casing 20.

According to FIG. 1, pump casing 20 can include a support surface 22 protruding from pump casing 20. During the introduction of flange 10 around pump casing 20, stop members 11 come into contact with support surface 22. Support surface 22 makes it possible to stop the translation of the flange in the direction of introduction 30 of flange 10 around pump casing 20. Support surface 22 also makes it possible to angularly position flange 10 in relation to pump casing 20 by rotation of flange 10 in contact with the support surface. Support surface 22 is arranged in a plane perpendicular to axis 32 of passage 13 corresponding to an axis of introduction of pump casing 20 into flange 10. Support surface 22 protrudes from pump casing 20 beyond snug 21 in the direction of introduction 30 of the flange around pump casing 20.

Support surface 22 can be continuous; support surface 22 can also be discontinuous thereby forming several angular sectors. The angle between each sector can be smaller than stop members 11. Thus, during the introduction, when the flange comes into contact with support surface 22, all of stop members 11 are placing on support surface 22. This allows the resting of the flange on the support surface to be stable.

If necessary, the rotation of the flange is ensured by protuberances 15 in contact with support surface 22. This ensures stable rotation of the flange.

Figure 2:
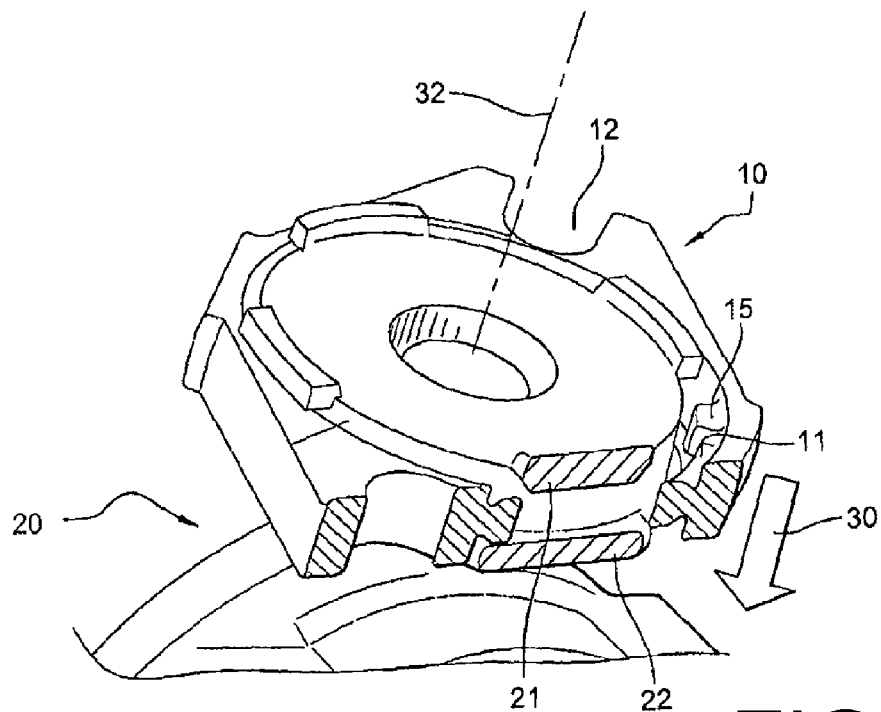
FIGS. 2 and 3, perspective and cross-sectional views of the flange of FIG. 1 during adjustment on the pump casing of FIG. 1.
Figure 3:
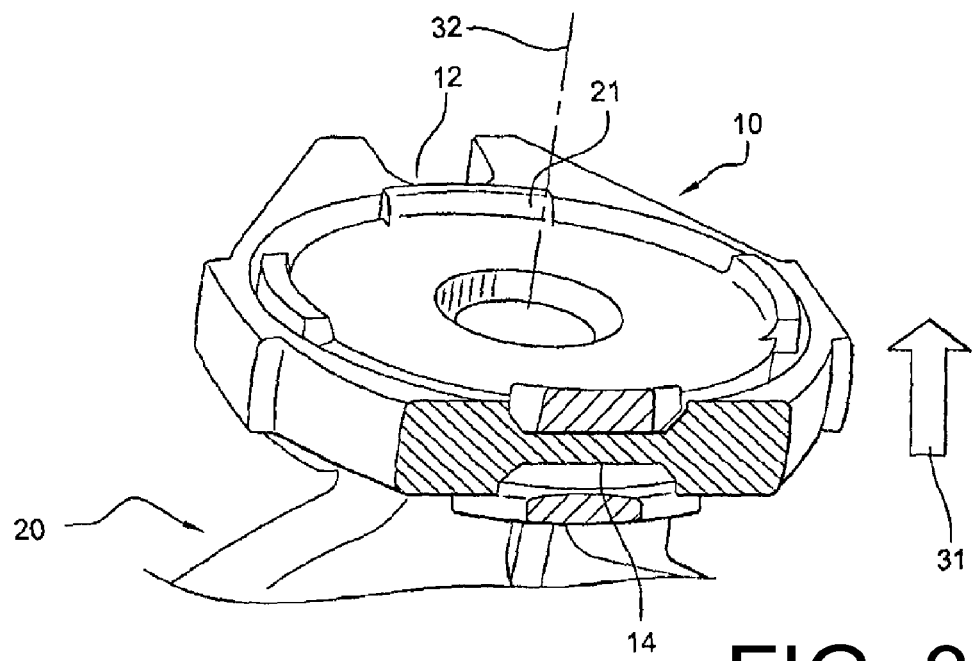
Figure 8:
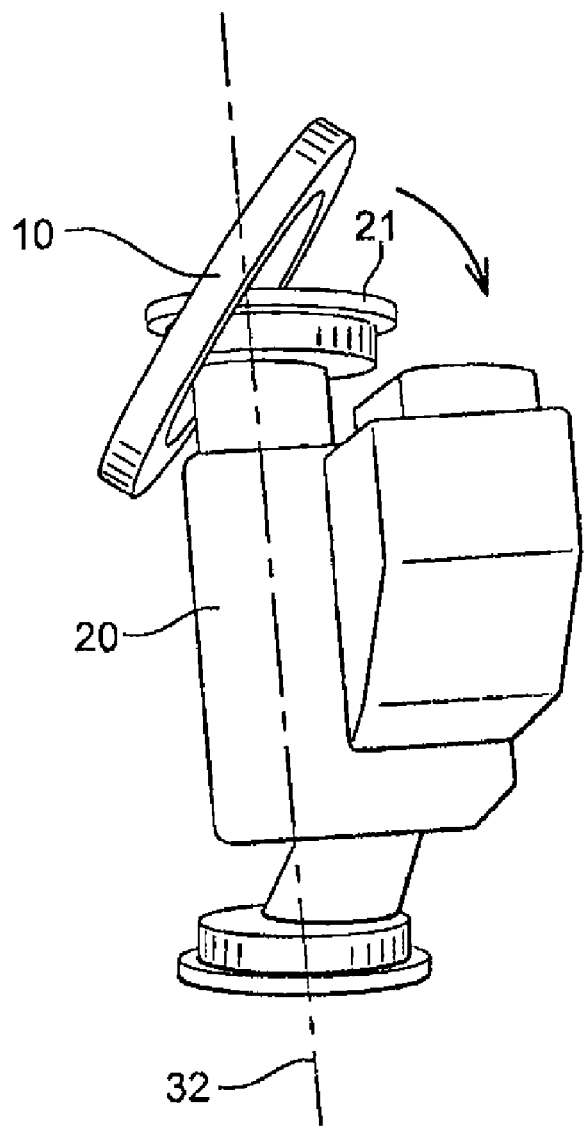
FIG. 8, a perspective view of the flange of FIG. 1 during adjustment on a pump casing.

A method for adjusting the position of flange 10 in relation to a pump casing 20 (and in particular in relation to the heads of the pump where the inlet and outlet orifices open) is now described. FIGS. 2, 3 and 8 illustrate this method. FIGS. 2 and 3 are perspective and cross-sectional views of flange 10 of FIG. 1 during adjustment on pump casing 20. FIG. 8 is a perspective view of the assembly of flange 10 of FIGS. 6 and 7 on pump casing 20 of FIG. 8.

FIG. 2 illustrates the introduction or the engagement of a flange 10 around a pump casing 20. Before introduction of flange 10, stop members 11 of flange 10 are angularly shift in relation to snug 21 of pump casing 20. Arrow 30 illustrates the direction of introduction 30, along Axis 32. Flange 10 is moved in the direction of introduction 30 until it comes into contact with support surface 22, beyond the snug 21. The trajectory of the flange is a translation of the flange such that the axis 32 of passage 13 is also the axis of the orifices of the pump casing. After the introduction of the flange 10, the flange is rotated around pump casing 20 up to the desired angular position of the flange. The rotation of flange 10 can be done in the desired direction of rotation. Support surface 22 enables guiding of the flange in rotation. In the desired angular position, stop members 11 are in front of snug 21. In particular, the positioning housings 14 are in front of the snug 21. The desired angular position of flange 10 is such that the attachment zones of the flanges of pump casing 20 and the line are opposite.

FIG. 3 illustrates the translation of flange 10 up to a final position of flange 10 in relation to pump casing 20. The translation is done in the direction opposite the direction of introduction 30 of flange 10. Arrow 31 shows this translation along axis 32. The translation along arrow 31 is stopped by the cooperation (or the bringing into engagement) of stop members 11 with the snug 21. Thus flange 10 is arranged on pump casing 20. In particular, during translation along arrow 31, snug 21 penetrate in positioning housings 14 respective.

Flange 10 is then immobilized in an angular position by protuberances 15. In this position, flange 10 is positioned to be tightened against a corresponding flange of the line. The tightening of the opposite flanges is done by the introduction of an attachment member in recesses 12.

Figure 4:
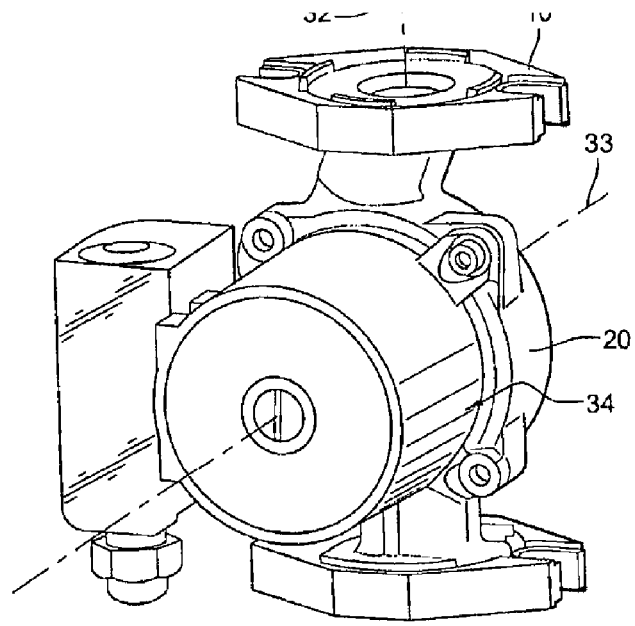
FIGS. 4 and 5, a perspective view of the pump casing provided with two flanges of FIG. 1.
Figure 5:
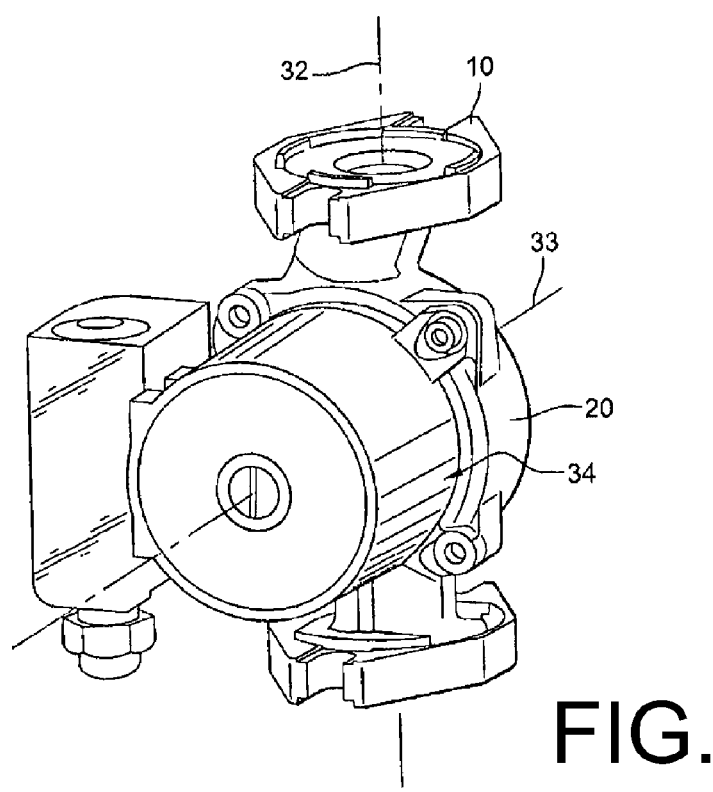

FIGS. 4 and 5 illustrate two perspective views of a pump including a pump casing 20 provided with two flanges 10 and a motor 34. FIG. 4 illustrates a first position in which the attachment zones are according a direction perpendicular to axis 33 of the motor of the pump. FIG. 5 illustrates a second position in which the attachment zones are according a direction parallel to axis 33 of the motor of the pump. The flanges can be placed from one position to another by rotation against support surface 22.

A method for adjusting the position of flange 10 according to FIGS. 6 and 7 in relation to a pump casing 20 is now described in relation to FIG. 8. The engagement of this flange 10 is done by inclining the flange in relation to the pump casing (the axes of the passage of the flange is inclined in relation to axis 32) so as to have the largest diameter of passage 13 of the flange in front of stop surface 21 of the pump casing. A stop member 11 of the flange is positioned under stop surface 21 of the pump casing and the other stop member 11 is positioned above stop surface 21. Flange 10 is, for example, positioned in a plane at 450 in relation to axis 32. Stop surface 21 is then introduced through passage 13, then flange 10 is pulled down in a plane perpendicular to axis 32 according to the arrow in FIG. 8. The two stop members 11 are then under stop surface 21. Then, flange 10 is brought back up along axis 32 until stop members 11 are connected (or engaged) by contact with stop surface 21. After, flange 10 can be angularly adjusted around axis 32 up to the desired position of flange 10. Stop members 11 and stop surface 21 being smooth, the angular position of the flange can be precisely adjusted. The desired angular position of flange 10 is such that the attachment zones of the flanges of pump casing 20 and of the line are opposite. In this position, flange 10 is positioned to be tightened against a corresponding flange of the line. The tightening of the opposite flanges is done by the introduction of an attachment member in recesses 12. Stop members 11 can also include protuberances 17 as previously discussed in order to provide the same advantages.

These methods allow to angularly adjust flange 10 in relation to pump casing 20. The position of flange 10 can be oriented independently of the position of pump casing 20 in relation to the line. It is no longer necessary to orient pump casing 20 in relation to the flange of the line. It is sufficient only to orient flange 10 appropriately in relation to pump casing 20.

Moreover, one can provide for the arrangement of a joint between pump casing 20 and the line in order to ensure sealing between pump casing 20 and the line. The joint is then compressed between the line and pump casing 20 during tightening of the flanges. In order to facilitate the placement of the joint on pump casing 20, stop surface 21 can be protruding from the surface of pump casing 20 opposite the line, along axis 32 of passage 13.

Preferably, the flanges are identical for different pump casing versions. This makes it possible to reduce the number of spare part references for the flanges.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A pump including:
   a fastening flange including a pump casing passage and a plurality of stop members protruding in the pump casing passage and angularly arranged around the pump casing passage; and
   a pump casing extending in the pump casing passage of the flange, the pump casing including a stop surface, the position of the flange being angularly adjustable in relation to the pump casing by connecting the stop surface and the stop members.

2. The pump according to claim 1, wherein the stop surface comprises a plurality of snug protruding from the pump casing, the position of the flange being angularly adjustable in relation to the pump casing by connecting the stop members and the snug.

3. The pump according to claim 2, wherein the pump casing includes as many snug as there are stop members and a distribution of the snug around the pump casing corresponds to a distribution of the stop members.

4. The pump according to claim 2, wherein the stop members of the flange each comprise a positioning housing for positioning of the flange, each of the positioning housings being open according to a direction along the lengthwise of the pump casing passage and wherein each snug is received in one of the positioning housings of the flange.

5. The pump according to claim 2, wherein the stop members each comprise two positioning housings for positioning of the flange, each positioning housing being open according to a direction opposite in the lengthwise of the passage.

6. The pump according to claim 1, wherein the flange further comprises a support surface, the position of the flange being angularly adjusted in relation to the pump casing by rotation of the flange around the pump casing on the support surface.

7. The pump according to claim 1, wherein the pump casing further comprises a single stop surface which is continuous on the perimeter of the pump casing.

8. The pump according to claim 1, wherein the stop members of the flange comprise a flat surface perpendicular to the pump casing passage.

9. The pump according to claim 1, wherein the flange is removable in relation to the pump casing.

10. A method for adjusting the position of a flange in relation to a pump, the method comprising:
    rotating the flange around a pump casing up to a desired angular position of the flange in relation to the pump casing, the pump casing including a stop surface and extending in a pump casing passage of the flange, and
    connecting the stop surface with a plurality of stop members protruding in the pump casing passage and angularly distributed around the pump casing passage.

11. The method for adjusting the position of a flange in relation to a pump according to claim 10, further comprising:
    engaging the flange on the pump casing up to a support surface of the flange, the stop members of the flange being angularly shifted in relation to a plurality of snug, and
    guiding the flange in rotation by the support surface.

12. The method for adjusting the position of a flange in relation to a pump according to claim 10, further comprising:
    engaging the flange on the pump casing by inclining the flange in relation to the pump casing until the stop surface is introduced through the pump casing passage; and placing the stop members into contact under the stop surface.

13. The method for adjusting the position of a flange in relation to a pump according to claim 10, wherein the stop members of the flange each include a positioning housing for positioning of the flange, each positioning housing being open according a direction in the lengthwise of the pump casing passage and wherein the connecting operation further comprises introducing snug into each of the positioning housings of the flange.

14. The method for adjusting the position of a flange in relation to a pump according to claim 10, wherein the stop members comprise protuberances protruding parallel to the axis of the pump casing passage and the connecting operation further comprises placing the protuberances of the stop members in contact with the stop surface.

* * * * *